(12) United States Patent
Scholz

(10) Patent No.: US 7,458,292 B2
(45) Date of Patent: Dec. 2, 2008

(54) CATCH NUT

(75) Inventor: Michael Scholz, Poppenlauer (DE)

(73) Assignee: Rexroth Star GmbH, Schweinfurt (DE)

( * ) Notice: Subject to any disclaimer, the term of this patent is extended or adjusted under 35 U.S.C. 154(b) by 641 days.

(21) Appl. No.: 10/961,568

(22) Filed: Oct. 8, 2004

(65) Prior Publication Data

US 2005/0132831 A1 Jun. 23, 2005

(30) Foreign Application Priority Data

Oct. 17, 2003 (DE) ................................ 103 48 320

(51) Int. Cl.
 *F16H 1/18* (2006.01)
(52) U.S. Cl. .................... 74/424.72; 74/89.26; 74/89.42
(58) Field of Classification Search ................ 74/89.23, 74/89.25, 89.26, 89.42, 441, 440, 424.71, 74/424.7, 424.72
See application file for complete search history.

(56) References Cited

U.S. PATENT DOCUMENTS

| | | | | |
|---|---|---|---|---|
| 4,677,869 A | * | 7/1987 | Mayfield | 74/424.83 |
| 4,872,795 A | * | 10/1989 | Davis | 411/433 |
| 5,732,596 A | * | 3/1998 | Erikson et al. | 74/441 |
| 6,041,671 A | * | 3/2000 | Erikson et al. | 74/441 |
| 6,131,478 A | * | 10/2000 | Erikson et al. | 74/441 |
| 6,158,720 A | * | 12/2000 | Patrick et al. | 254/103 |
| 6,240,798 B1 | * | 6/2001 | Erikson et al. | 74/424.81 |
| 6,422,101 B2 | * | 7/2002 | Erikson et al. | 74/89.42 |
| 6,467,362 B2 | * | 10/2002 | Erikson et al. | 74/89.36 |
| 2003/0094056 A1 | * | 5/2003 | Park | 74/89.42 |
| 2004/0250637 A1 | * | 12/2004 | Hosokai et al. | 74/89.42 |
| 2006/0037421 A1 | * | 2/2006 | Husistein | 74/89.42 |

FOREIGN PATENT DOCUMENTS

| | | |
|---|---|---|
| DE | 43 33 335 A1 | 3/1995 |
| DE | 693 07 228 T2 | 7/1997 |
| DE | 199 60 932 A1 | 7/2000 |
| DE | 196 25 999 C2 | 9/2000 |
| DE | 201 12 533 U1 | 11/2001 |
| EP | 0 995 714 A1 | 4/2000 |
| JP | 11-82665 | 3/1999 |

\* cited by examiner

*Primary Examiner*—David M Fenstermacher
(74) *Attorney, Agent, or Firm*—Michael J. Striker

(57) ABSTRACT

A threaded drive has a threaded spindle having a longitudinal axis, a supporting nut which is in a screw engagement with the threaded spindle with a first clearance and which is rotatable relative to the threaded spindle about the longitudinal axis, a catch nut which is in a screw engagement with the threaded spindle with a second predetermined clearance which is greater than the first predetermined clearance, the catch nut being freely rotatable relative to the supporting nut, and also being bringable in a clamping engagement with the supporting nut and fixable on the supporting nut in any desired relative rotary position.

17 Claims, 3 Drawing Sheets

CATCH NUT

CROSS-REFERENCE TO A RELATED APPLICATION

The invention described and claimed hereinbelow is also described in German Patent Application DE 103 48 320.9 filed on Oct. 17, 2003. This German Patent Application provides the basis for a claim of priority of invention under 35 U.S.C. 119(a)-(d).

BACKGROUND OF THE INVENTION

The present invention relates generally to threaded drives.

More particularly it relates to a threaded drive which includes a threaded spindle with a longitudinal axis, a supporting nut which is in screw engagement with a first predetermined clearance with the threaded spindle and is turnable relative to the threaded spindle around its longitudinal axis; and a catch nut which is in screw engagement with a second predetermined clearance with a threaded spindle, with the second predetermined clearance having a greater value than the first predetermined clearance.

Threaded drives provided with catch nuts are used in particular substantially with a vertical arrangement in the threaded spindle. The catch nut has the objective, when the supporting nut is failed, to prevent falling of the load carried by the threaded drive. This is important not only for commercial loads, but also is immensely important in particular when such threaded drives are used for lifting and lowering of operation tables and the like.

The German patent document DE 201 12 533 U1 discloses for example a threaded drive, in which the catch nut is screwed with a supporting nut so that with orderly operation of the supporting nut, the catch nut because of its greater clearance is not in screw engagement with the threaded spindle. When the screw engagement between the supporting nut and the threaded spindle fails, for example because of a breakage or the like, the catch nut comes into engagement with the threaded spindle. Because of the increased friction between the catch nut and the threaded spindle, the screw pin which holds the catch nut on the supporting nut is sheared off. As a result, the catch nut is retained in its instantaneous position and the supporting nut, because of the already destroyed screwing engagement with the threaded spindle, can freely turn on it.

In the threaded drive disclosed in the European patent document EP 0 995 714 A1, the catch nut is connected with the supporting nut by axial pins, so that the catch nut in orderly operation of the supporting nut is not in screw engagement with the threaded spindle. When the wear of the inner thread of the supporting nut increases, the inner thread of the catch nut more and more comes into screw engagement with the threaded spindle. Because of the torque produced thereby, the catch nut is gradually pulled into the supporting nut. Breaking tongs which are formed on the catch nut because of the cooperation of the wedge-shaped surfaces of the supporting nut and the catch nut are increasingly deformed toward the threaded spindle, and this increases the friction between the catch nut and the threaded spindle.

The Japanese patent document JP 8 11 082665 is also mentioned here to provide a complete picture of the prior art.

The disadvantage of the above discussed prior art solutions is that the catch nut is connected for joint rotation with the supporting nut by axial pins. When the axial openings for receiving or passage of these pins are prefabricated in the catch nut and the supporting nut, then both elements can be mounted with one another only in fully predetermined relative rotary positions. Thereby practically it is not possible to bring the catch nut in an optimal relative position with respect to the threaded spindle, or in other words a "central position", in which the flanks of its inner thread are arranged substantially centrally between the flanks of the outer thread of the threaded spindle.

With this problem of the off-center arrangement, an extensive and complicated procedure for mounting of the catch nut on the supporting nut takes place. First the catch nut which is not provided with the axial openings must be screwed on the threaded spindle and brought in contact with the supporting nut. Then the central arrangement of the catch nut relative to the threaded spindle must be determined, and the position of the axial openings in a mounting flange of the catch nut must be indicated in correspondence with the axial openings provided in the mounting flange of the supporting nut. Then, these openings after unscrewing of the catch nut by the threaded spindle, must be drilled. Then, with a new screwing of the catch nut, it can be finally mounted on the supporting nut by the screw pins.

SUMMARY OF THE INVENTION

Accordingly, it is an object of the present invention to provide a threaded drive of the above mentioned general type, which makes possible a stepless adjustment of the relative position of the catch nut and the threaded spindle with a simultaneous simplification of the mounting process.

In keeping with these objects and with others which will become apparent hereinafter, one feature of the present invention resides, briefly stated, in a threaded drive, in which the catch nut is freely rotatably formed with respect to the supporting nut, is bringable with it in a clamping engagement, and is fixable on the supporting nut in any desired relative rotary position.

In other words, it is formed "freely rotatable", means that a relative rotation of the supporting nut and the catch nut is not hindered by any positive or interlocking connection, but instead they cooperate with one another in a peripheral direction exclusively in a non-positive or frictional manner. This frictional connection can be however so strong that the catch nut is clamped on the supporting nut.

In the inventive threaded drive the catch nut can be mounted on the supporting nut in the following manner. First a catch nut is screwed on the threaded spindle and moved to the supporting nut so that it abuts against it, but can still freely rotate relative to it. In this condition the catch nut is brought relative to the threaded spindle in the previously defined central position and subsequently clamped with the supporting nut. A small axial movement, which the catch nut must perform on the supporting nut, can be taken into consideration with the adjustment of the central position of the catch nut relative to the threaded spindle.

In accordance with the present invention, the catch nut can be brought into a clamping engagement on the supporting nut by means of a clamping unit. The clamping unit in accordance with a first alternative embodiment of the invention, after the establishment of the clamping engagement between the supporting nut and the catch nut can be retained on the thusly formed group of components. For example, the clamping unit can secure the clamping engagement between the supporting nut and the catch nut, so that it, similarly to a swivel nut or a union nut, prevents an axial movement of the catch nut from the supporting nut. In a further embodiment of the present invention, it is proposed that the clamping unit is fixedly connectable with the supporting nut, for example by screw pins.

In accordance with a first embodiment of this alternative variant, the outer peripheral surface of the catch nut can be formed at least partially as a conical surface, which reduces in a direction away from the supporting nut and cooperates with a counter conical surface of the clamping unit. This embodiment has the advantage that it can transmit very high torques from the supporting nut through the clamping unit to the catch nut. This is in particular important in view of the desired process in the case of a failure of the supporting nut:

When the supporting nut fails, and the catch thereby comes into engagement with the threaded spindle, it is possible that the friction between the catch nut and the threaded spindle is greater than the friction between the catch nut and the supporting nut or the clamping unit connected with it.

In this case the clamping engagement between the catch nut and the supporting nut or the clamping unit connected with it could loosen and the catching nut would slip relative to the supporting nut. The conditions in this situation would be similar to the conditions disclosed in the above cited patent document DE 201 12 533 U1. This is however not desired since in this case there is a danger that the user removes the destroyed supporting nut from the threaded spindle and replaces it with a new, functionally efficient supporting nut. As experience shows, that failure of the supporting nut however is connected with an irrepairable damage of the threaded spindle so that in this case replacement of the supporting nut will not lead to a properly functioning threaded drive.

When the catch nut remains in the case in the failure of the supporting nut connected with it in a peripheral direction, the high friction between the threaded spindle and the catch nut leads, in particular when the catch nut is composed of a light metal or a light alloy, preferably aluminum or an aluminum alloy, to an extensive heating of the catch nut. Within a short time, it becomes baked or welded with the threaded spindle. In this way, the total nut arrangement blocks the threaded spindle, which can be detected by a control unit because of an intense current increase of the electric motor that drives the supporting nut. Because of the baking or welding, the user automatically exchanges the whole nut-spindle unit, so that after the repair actually a completely functionally suitable unit becomes available.

In accordance with the second embodiment of the first variant, the catch nut can be provided, at a side facing away from the supporting nut, with an engaging surface which extends preferably substantially orthogonal to the longitudinal axis. It is bringable into engagement with an associated counter engaging surface of the clamping unit. This embodiment is simple to manufacture when compared with the above described conical embodiment.

In accordance with a second alternative embodiment variant, the clamping unit after producing the clamping engagement between the supporting nut and the catch nut can be releasable from the catch nut. In this case the clamping unit takes more of the function of a mounting assisting unit. This assisting can be for example in a substantially clearance-free screw engagement with the threaded spindle. When the catch nut is mounted on this auxiliary or clamping unit, it can move relative to the threaded spindle without changing the relative position of the flanks of its inner thread relative to the flanks of the outer thread of the threaded spindle. The catch nut can be fixed on the clamping nut in the desired central position relative to the threaded spindle and with maintaining this central position moved on the supporting nut, until the supporting nut and the catch nut are clamped with one another.

Subsequently, the clamping unit is removed from the catch nut. When a small axial movement of the catch nut on the supporting nut is required, to obtain the desired clamping between the catch nut and the supporting nut, it can be taken into consideration by small axial movement during the fixing of the catch nut on the clamping unit.

In accordance with a further embodiment of the second alternative variant, it is proposed that the outer peripheral surface of the catch nut is formed at least partially as a conical surface which narrows in a direction toward the supporting nut and which is bringable in a clamping engagement with a counter conical surface of the supporting nut. In this case, the conical surface has the advantage that it can transfer high torques.

In addition to the stepless relative positioning of the catch nut and the supporting nut, with a simultaneous simple mounting, a further advantage in accordance with the present invention is provided in that the numerous combination possibilities of thread diameter and pitch of the threaded spindle on the one hand and the flange diameter of the supporting nut on the other hand can be realized at the sides of the catching nut with a low number of parts. The catch nut need only be adapted to the thread diameter and the pitch of the threaded spindle. An adaptation to the flange diameter of the supporting nut in the second alternative variant is either mainly not needed or in accordance with the first alternative variant can be realized by the clamping unit which remains on the supporting nut-catch nut unit.

The inventive type of the connection of the catch nut and the supporting nut can be used for threaded drives of any type, and also when the supporting nut is a roll body revolution nut, and also when the supporting nut is a screw nut with an inner thread fixedly formed on it.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
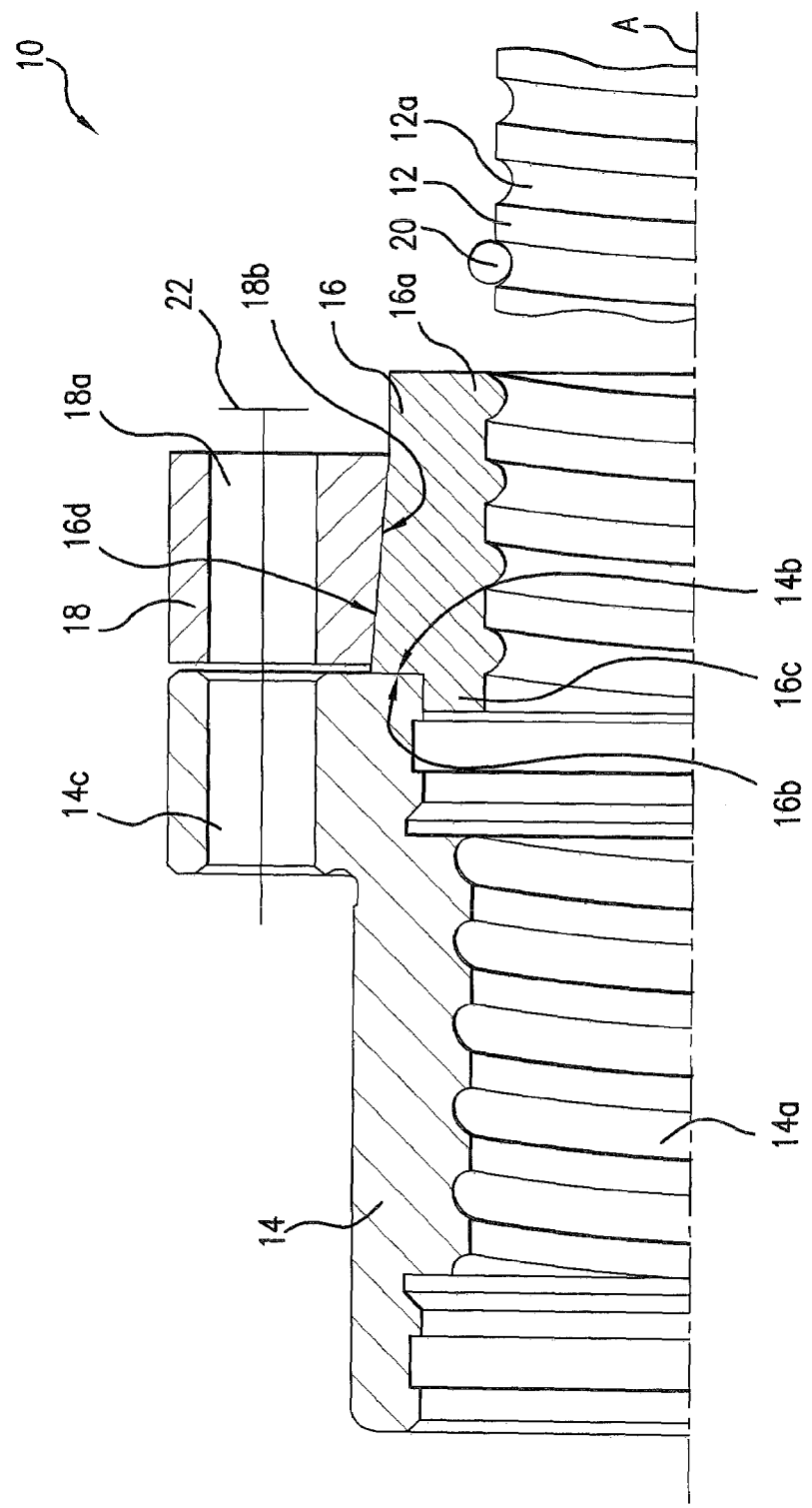
FIGS. 1 and 2 are schematic sectional views of two embodiments of the present invention, in which a clamping unit in operation remains on a unit composed of a supporting nut and a catch nut.

FIG. 1 shows an inventive threaded drive which is identified as a whole with reference numeral 10. The threaded drive includes a threaded spindle 12 which in FIG. 1 is shown only as a short portion. The threaded spindle 12 extends in direction of an axis A, which in particular in the case of the application of the threaded drive 10 as a lifting and lowering drive, extends vertically. Such lifting and lowering drives are used for example in operation tables or hospital beds.

A supporting nut 14 is arranged on the threaded spindle 12. In the shown embodiment it is formed as a roll body revolution nut. For this purpose the outer peripheral surface of the threaded spindle 12 has a helical groove 12a and the inner peripheral surface of the supporting nut 14 has a helical groove 14a, which together form a load receiving portion of a peripheral passage. An endless row of roll bodies 20 revolve in the thusly formed passage. Basically, it is however also possible that the supporting nut 14 is provided with a fixed inner thread, which is in screw engagement with the corresponding counter thread of the threaded spindle 12.

In both cases, the screw engagement of the supporting nut 14 and the threaded spindle 12 has a small clearance, to maintain low the hysteresis effects during the reverse of the movement direction of the supporting nut 14 relative to the threaded spindle 12.

A catch nut 16 is arranged on the threaded spindle 12 and is connected with the supporting nut 14 through a clamping unit 18. The catch nut 16 on its inner peripheral surface has a stationary thread 16a, which is in a screw engagement with the thread 12a of the threaded spindle 12. A clearance of the screw engagement between the catch nut 16 and the threaded spindle 12 is greater between the clearance of the supporting nut 14 and the threaded spindle 12.

During a normal operation of the threaded drive 10, or in other words when the supporting nut 14 is in a full functional screw engagement with the threaded spindle 12, the relative rotation between the supporting nut 14 and the catch nut 16 which moves together with it is selected so that the flanks of the inner thread 16a of the catch nut 16 do not contact the flanks of the thread groove 12a of the threaded spindle 12, but instead are arranged relative to them for example centrally.

If the threaded drive 10 fails, for example because of a breakage of the roll body 20 or the running groves 12a or 14a of the threaded spindle 12 or the supporting nut 14, then the inner thread 16a of the catch nut 16 reaches a frictional contact with thread grove 12a of the threaded spindle 12. Since the threaded spindle 12 conventionally is composed of steel, and the catch nut 16 to the contrary is composed of a light metal or a light metal alloy, for example aluminum or an aluminum alloy, this frictional contact leads to an intense heating of the catch nut 16, so that it is baked or welded with a threaded spindle 12. As a result, the catch nut 16 is blocked on the threaded spindle 12 and prevents a through falling of the supporting nut 14 and the load connected with it. This is especially relevant from safety reasons when the inventive threaded drive 10 is used as a lifting and lowering drive of an operation table.

For obtaining the above mentioned central arrangement of the thread 16a of the catch nut 16 in the thread groove 12a of the threaded spindle 12 in a simple manner, the catch nut 16 is formed freely rotatably relative to the supporting nut 14. In other words, in a peripheral direction around the axis A there is no positive or form-locking engagement between the supporting nut 14 and the catch nut 16, but instead there is a non-positive or frictional engagement. This frictional engagement in the course of mounting of the catch nut 16 on the supporting nut 14 is so great, that the catch nut 16 is clamped on the supporting nut 14 and therefore at least in a normal orderly operation of the threaded drive 10 it no longer rotates relative to the supporting nut.

In the embodiment shown in FIG. 1, this clamping engagement is provided by a clamping unit 18, that also after the mounting or in other words during the operation of the threaded drive 10, remains on the unit composed of the supporting nut 14 and the catch nut 16.

For bringing the catch nut 16 onto the supporting nut 14, in accordance with the present invention the catch nut 16 is screwed on the threaded spindle 12, on which the supporting nut 14 is already located. The catch nut 16 is moved onto the supporting nut 14 until it abuts with its end surface 16b against the end surface 14b of the catch nut 14. The projection 16c of the catch nut 16, that engages in the supporting nut 14, serves however for centering of the catch nut 16 relative to the supporting nut 14. In this abutment condition, the swivel or clamping unit 18 is placed on the catch nut 16 and first loosely mounted on the supporting nut 14 by screw pins 22 which extend through the corresponding passages 18a of the clamping unit 18 and 14c of the supporting nut 14.

It is important that the catch nut 16 is also freely rotatable relative to the clamping unit 18 in a peripheral direction around the axis A. In the thusly obtained mounting condition the catch nut, with maintaining the contact of the end surfaces 14b and 16b, can turn relative to the supporting nut 14 to a position in which the flanks of its inner thread 16a are arranged substantially centrally between the flanks of the thread groove 12a of the threaded spindle 12. When this desired relative rotary position of the catch nut 16 and the supporting nut 14 is set, the screw pins 22 are firmly tightened, so that the catch nut 16 is clamped by the clamping unit 18 firmly on the supporting nut 14.

In the embodiment of FIG. 1, the clamping force between the clamping unit 18 and the catch nut 16 is transmitted through cooperating conical surfaces 18b on the inner periphery of the clamping unit 18 and 16d on the outer periphery of the catch nut 16. In particular, the conical surface 16d of the catch nut 16 narrows from the end facing the supporting nut 14 to the end facing away from the supporting nut 14. The advantage of the embodiment of FIG. 1 is that very high torques can be transmitted due to the cooperating conical surfaces 18b and 16d of the clamping unit 18 and the catch nut 16.

Figure 2:
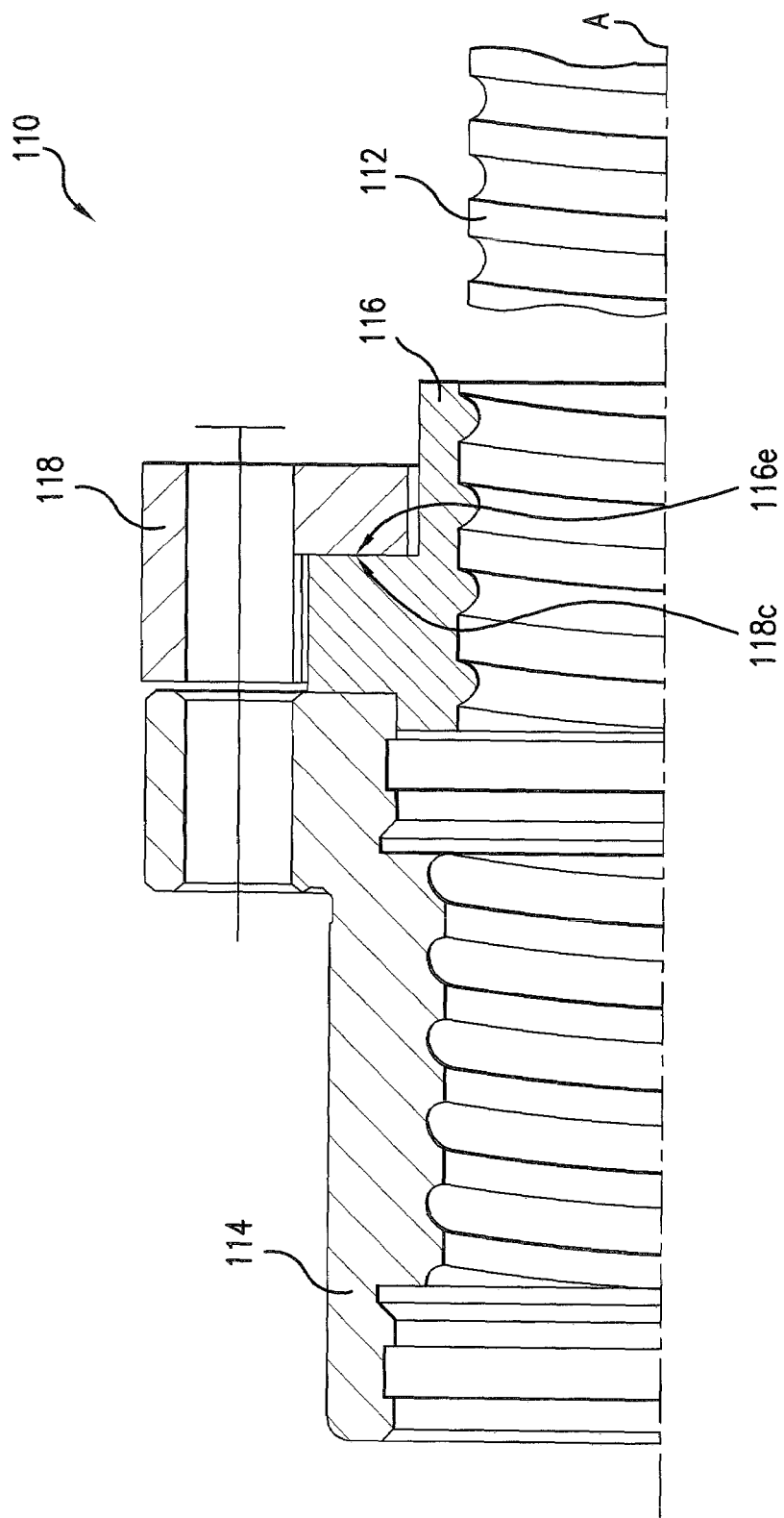

FIG. 2 shows a further embodiment of the inventive threaded drive, which substantially corresponds to the embodiment shown in FIG. 1. In FIG. 2 analogous parts are identified with the same reference numerals but increased by number 100. Moreover, the threaded drive 110 shown in FIG. 2 is described herein below only in those parts in which it is different form the threaded drive 10 of FIG. 1 to emphasize the new features.

The only difference between the threaded drive 110 in FIG. 2 and the threaded drive 10 in FIG. 1 is that the clamping force between the clamping unit 118 and the catch nut 116, with which the catch nut 116 is held in clamping engagement with the supporting nut 114, is not produced by the cooperating conical surfaces of the clamping unit 118 and the catch nut 116. Instead, it is produced by the cooperation of an end surface 116e of the catch nut 116 with a counter end surface 118c of the clamping unit 118. Thereby both the end surface 116e of the catch nut 116 and the counter end surface 118c of the clamping unit 118 extends substantially orthogonal to the axis A of the threaded spindle 112.

Figure 3:
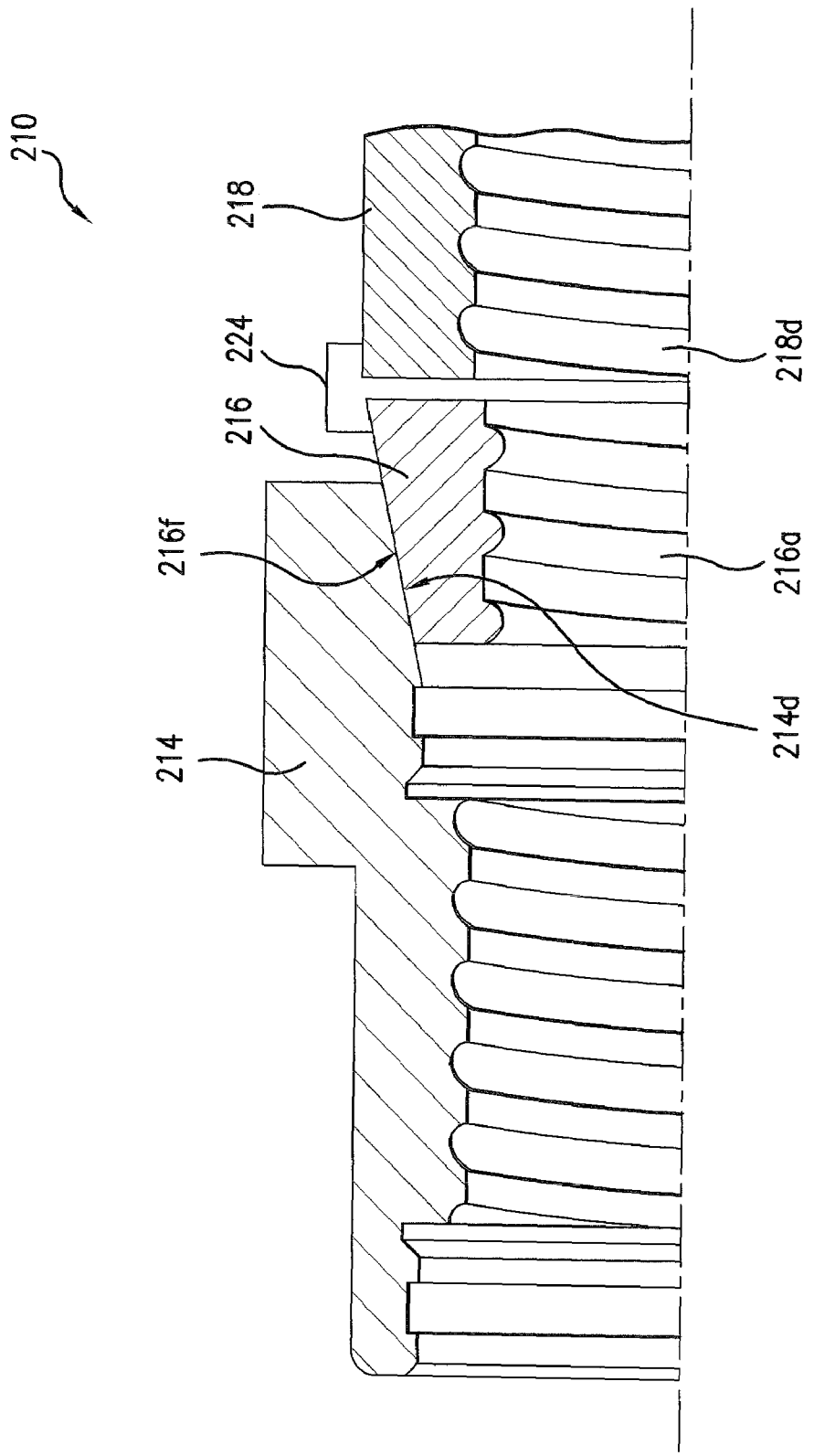
FIG. 3 is a view showing an embodiment in accordance with the present invention, in which the clamping unit after clamping of the catch nut and the supporting nut is removed from the catch nut.

FIG. 3 shows a further embodiment of an inventive threaded drive, which substantially corresponds to the embodiment of FIGS. 1 and 2. The analogous parts in FIG. 3 are identified with the same reference numerals as in FIG. 1, but increased by number 200. Moreover, the threaded drive 210 of FIG. 3 is described only in those parts in which it is different from the threaded drives 10,110 of FIGS. 1 and 2 to emphasize the new features.

In a threaded drive 210 shown in FIG. 3, the clamping unit 218, after the establishment of the clamping engagement between the catch nut 216 and the supporting nut 214, is not retained on the unit formed by both nuts. Moreover, the catch nut 216 in the embodiment shown in FIG. 3 is clamped directly with the supporting nut 214, so that the clamping unit 218 can be removed. For mounting of the catch nut 216 and the supporting nut 214, the following steps are executed:

First the catch nut 216 and the clamping unit 218 are screwed on a threaded spindle which is not shown in FIG. 3, on which the catch nut 214 is already located. For this purpose in the embodiment of FIG. 3 also the clamping unit 218, which in this case serves only as a mounting assistance unit, is formed with an inner thread 218*d*. The inner thread 218*d* can be formed either as a stationary inner thread, or alternatively, the clamping unit can be formed as a roll body of revolution nut. The clamping unit 218 must be however provided with a clearance relative to the threaded spindle, which substantially corresponds to the clearance between the supporting nut 214 and the threaded spindle or for example is smaller than this clearance. The catch nut is brought in its rotary position relative to the clamping unit 218, so that the flanks of its inner thread 216*a* are arranged substantially centrally between the flanks of the threaded groove in the threaded spindle. This relative rotary position between the clamping unit 218 and the catch nut 216 is secured by a holder 224. The unit formed by the catch nut 216 and the clamping unit 218 is then moved onto the supporting nut 214 until the catch nut 216 with its conical outer peripheral surface 216*a* is in clamping engagement with a corresponding conical inner peripheral surface 214*d* of the catch nut 214. When the catch nut 216 is held by the clamping engagement reliably on the supporting nut 214, the holder 224 can be released and the clamping unit 218 can be removed from the unit formed by the supporting nut 214 and the catch nut 216.

It will be understood that each of the elements described above, or two or more together, may also find a useful application in other types of constructions differing from the types described above.

While the invention has been illustrated and described as embodied in catch nut, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A threaded drive comprising a threaded spindle having a longitudinal axis; a catch nut which is in a screw engagement with said threaded spindle with a first clearance and which is rotatable relative to said threaded spindle about said longitudinal axis; a catch nut which is in a screw engagement with said threaded spindle with a second predetermined clearance which is greater than the first predetermined clearance, said catch nut being freely rotatable relative to said supporting nut without an interlocking positive connection but with a nonpositive frictional cooperation in a peripheral direction, and also being clampingly engageable with said supporting nut and fixable on said supporting nut in a desired relative rotary position.

2. A threaded drive as defined in claim 1; and further comprising a clamping unit which brings said catch nut in the clamping engagement with said supporting nut.

3. A threaded engagement as defined in claim 2, wherein said clamping unit is formed so that after establishing the clamping engagement between said supporting nut and said catch nut it remains on a unit formed by said supporting nut and said catch nut.

4. A threaded engagement as defined in claim 2; and further comprising means for fixedly connecting said clamping unit with said supporting nut.

5. A threaded engagement as defined in claim 4, wherein said fixedly connecting means include screw pens.

6. A threaded engagement as defined in claim 2, wherein said catch nut has an outer peripheral surface which is formed at least partially as a conical surface narrowing in a direction facing away from said supporting nut, said clamping unit having a counter conical surface with which said conical surface cooperates.

7. A threaded engagement as defined in claim 2, wherein said catch nut has an engaging surface provided at a side facing away from said supporting nut, said clamping unit having an associated counter engaging surface with which engaging surface cooperates.

8. A threaded engagement as defined in claim 7, wherein said engaging surface of said supporting nut extends substantially orthogonal to said longitudinal axis.

9. A threaded engagement as defined in claim 2, wherein said clamping unit is formed so that after establishing the clamping engagement of the supporting nut and the catch nut it is releasable from said catch nut.

10. A threaded engagement as defined in claim 9, wherein said catch nut has an outer peripheral surface which is formed at least partially as a conical surface and narrows in a direction facing said supporting nut, said supporting nut having a counter conical surface with which said conical surface is clampingly engageable.

11. A threaded engagement as defined in claim 9, wherein said clamping unit has an inner thread, and said threaded spindle has an outer thread, which are bringable in a screw engagement with one another with a predetermined clearance.

12. A threaded engagement as defined in claim 1, wherein said supporting nut is formed as a body of revolution nut.

13. A threaded engagement as defined in claim 1, wherein said supporting nut is formed as a screw nut with an inner thread fixedly formed on it.

14. A threaded engagement as defined in claim 1, wherein said catch nut is composed of a light metal.

15. A threaded engagement as defined in claim 1, wherein said catch nut is composed of aluminum.

16. A threaded engagement as defined in claim 1, wherein said catching nut is comprised of a light metal alloy.

17. A threaded engagement as defined in claim 1, wherein said catch nut is comprised of an aluminum alloy.

\* \* \* \* \*